(12) United States Patent
Shaw et al.

(10) Patent No.: US 10,805,349 B2
(45) Date of Patent: Oct. 13, 2020

(54) METHOD AND SYSTEM TO SECURE AND DYNAMICALLY SHARE IOT INFORMATION CROSS MULTIPLE PLATFORMS IN 5G NETWORK

(71) Applicant: AT&T Intellectual Property I, L.P., Atlanta, GA (US)

(72) Inventors: Venson Shaw, Kirkland, WA (US); Sangar Dowlatkhah, Alpharetta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 216 days.

(21) Appl. No.: 15/473,353

(22) Filed: Mar. 29, 2017

(65) Prior Publication Data

US 2018/0288095 A1    Oct. 4, 2018

(51) Int. Cl.
*G06F 12/08*    (2016.01)
*G06F 21/53*    (2013.01)
(Continued)

(52) U.S. Cl.
CPC .......... *H04L 63/20* (2013.01); *G06F 21/6218* (2013.01); *G09C 1/00* (2013.01);
(Continued)

(58) Field of Classification Search
CPC . G06F 9/50; G06F 12/08; G06F 16/00; G06F 16/22; G06F 16/25; G06F 21/08;
(Continued)

(56) References Cited

U.S. PATENT DOCUMENTS 8,533,803 B2    9/2013  Cha et al.
8,984,113 B2    3/2015  Li et al.
(Continued)

FOREIGN PATENT DOCUMENTS

JP          6017733 B2    11/2016
KR     20130027097 A     3/2013
(Continued)

OTHER PUBLICATIONS

"Mobile Security Industry Calls for Forthcoming 5G Standard to Provide Robust Security Appropriate to Use Case"; http://isimalliance.org/media/press-releases/mobile-security-industry-calls-for-forthcoming-5g-standard-to-provide-robust-security-appropriate-to-use-case/; simalliance; Oct. 2016; one page.

(Continued)

*Primary Examiner* — Alexander Lagor
*Assistant Examiner* — Kalish K Bell
(74) *Attorney, Agent, or Firm* — BakerHostetler

(57) ABSTRACT

A device includes a processor having a trusted security zone and trusted memory communicatively coupled to the trusted security zone to form a trusted execution environment (TEE) in which trusted applications operate. The trusted memory has a common repository. The device includes memory storing instructions that cause the processor to effectuate operations. The operations include receiving, from a first trusted application of the trusted applications, a first application data and storing the first application data in the common repository. The operations include determining that a second trusted application of the trusted applications has permission to access the first application data based on a policy module of the TEE and allowing the second trusted application to access the first application data.

20 Claims, 10 Drawing Sheets

(51) Int. Cl.
  *G06F 21/57* (2013.01)
  *G06F 16/00* (2019.01)
  *G06F 16/22* (2019.01)
  *G06F 16/25* (2019.01)
  *G06F 21/12* (2013.01)
  *G06F 21/62* (2013.01)
  *G06F 9/50* (2006.01)
  *H04L 29/06* (2006.01)
  *H04L 29/08* (2006.01)
  *G09C 1/00* (2006.01)
  *H04L 12/24* (2006.01)

(52) U.S. Cl.
  CPC .......... *H04L 63/1433* (2013.01); *H04L 67/12* (2013.01); *H04L 41/0893* (2013.01); *H04L 63/10* (2013.01); *H04L 67/306* (2013.01); *H04L 2209/127* (2013.01)

(58) Field of Classification Search
  CPC .......... G06F 21/12; G06F 21/53; G06F 21/57; G06F 21/62; G06F 21/74
  See application file for complete search history.

(56) References Cited

U.S. PATENT DOCUMENTS

| | | | |
|---|---|---|---|
| 9,036,820 | B2 | 5/2015 | Chastain et al. |
| 9,111,100 | B2 | 8/2015 | Smith et al. |
| 9,111,105 | B2 | 8/2015 | Barton et al. |
| 9,385,862 | B2 | 7/2016 | Escott |
| 9,521,547 | B2 | 12/2016 | Park et al. |
| 2008/0270802 | A1* | 10/2008 | Ashley .................. G06F 21/10 713/184 |
| 2009/0249075 | A1* | 10/2009 | De Atley ............... G06F 21/51 713/176 |
| 2010/0262959 | A1* | 10/2010 | Bruno ................ G06F 21/6209 717/171 |
| 2011/0179412 | A1* | 7/2011 | Nakae ................... G06F 21/53 718/1 |
| 2012/0096513 | A1* | 4/2012 | Raleigh ............... H04L 12/1403 726/1 |
| 2012/0233656 | A1* | 9/2012 | Rieschick ........... H04L 63/1441 726/1 |
| 2015/0222517 | A1 | 8/2015 | McClaughlin et al. |
| 2015/0235024 | A1* | 8/2015 | Corrion .................. G06F 21/31 726/18 |
| 2015/0249642 | A1 | 9/2015 | Burns et al. |
| 2016/0182497 | A1 | 6/2016 | Smith et al. |
| 2016/0182499 | A1 | 6/2016 | Sharaga et al. |
| 2016/0255070 | A1 | 9/2016 | Naslund et al. |
| 2016/0277370 | A1 | 9/2016 | Lee et al. |
| 2016/0277930 | A1 | 9/2016 | Li et al. |
| 2016/0364553 | A1 | 12/2016 | Smith et al. |
| 2017/0005999 | A1 | 1/2017 | Choyi et al. |
| 2017/0012778 | A1 | 1/2017 | Choyi et al. |
| 2017/0118215 | A1* | 4/2017 | Varadarajan ............ H04L 63/10 |
| 2018/0368060 | A1* | 12/2018 | Kedalagudde ........ H04W 48/18 |

FOREIGN PATENT DOCUMENTS

| | | |
|---|---|---|
| WO | WO 2011/115407 A2 | 9/2011 |
| WO | WO 2015/174790 A1 | 11/2015 |
| WO | WO 2016/081837 A1 | 5/2016 |
| WO | WO 2016/093912 A2 | 6/2016 |
| WO | WO 2017/004373 A1 | 1/2017 |

OTHER PUBLICATIONS

Vasudevan et al.; "Lockdown: A Safe and Practical Environment for Security Applications"; CyLab—Carnegie Mellon University; CMU-CyLab-09-011; Jul. 2009; 18 pages.

Babar et al.; "Proposed Embedded Security Framework for Internet of Things (IoT)"; Wireless Communication, Vehicular Technology, Information Theory and Aerospace & Electronic Systems Technology (Wireless VITAE); 2011; 5 pages.

Bagci et al.; "Combined Secure Storage and Communication for the Internet of Things"; IEEE 10$^{th}$ Annual Communications Society Conf.; Sensor, Mesh and Ad Hoc Communications and Networks (SECON); 2013; 9 pages.

\* cited by examiner

200

202 — RECEIVE FIRST APPLICATION DATA FROM A FIRST TRUSTED APPLICATION

204 — STORE THE FIRST APPLICATION DATA IN THE COMMON REPOSITORY OF THE TRUSTED EXECUTION ENVIRONMENT

206 — DETERMINE THAT A SECOND TRUSTED APPLCIATION HAS PERMISSION TO ACCESS THE FIRST APPLICATION DATA BASED ON A POLICY MODULE

208 — ALLOW THE SECOND TRUSTED APPLCIATION TO ACCESS THE FIRST APPLICATION DATA

FIG. 2

METHOD AND SYSTEM TO SECURE AND DYNAMICALLY SHARE IOT INFORMATION CROSS MULTIPLE PLATFORMS IN 5G NETWORK

TECHNICAL FIELD

This disclosure is related generally to managing access to secure data in a device and, more specifically, to selecting a network configuration based on the secure data.

BACKGROUND

Sensory internet of things (TOT) devices may use a network-connected device, such as a smart phone or a tablet, to connect to their respective servers. For example, IOT devices may communicate with the network-connected devices via Bluetooth® or near-field communication (NFC) technologies. The data from the IOT devices may be encrypted on the network-connected device. Further, this encrypted data may be stored in the trusted execution environment (TEE) of the network-connected device.

The storage capacity of the TEE does not include a common repository in which an application can access encrypted data of another application stored in the TEE. Thus, data sharing between trusted applications and network resources unaffiliated with that encrypted data may be restricted or impossible.

SUMMARY

In an aspect, this disclose is directed to a device. The device may include a processor having a trusted security zone and trusted memory communicatively coupled to the trusted security zone to form a TEE in which trusted applications operate. The trusted memory may have a common repository. The device may include memory storing instructions that cause the processor to effectuate operations. The operations may include receiving, from a first trusted application of the trusted applications, a first application data and storing the first application data in the common repository. The operations may include determining that a second trusted application of the trusted applications has permission to access the first application data based on a policy module of the TEE and allowing the second trusted application to access the first application data.

In another aspect, this disclosure is directed to an apparatus. The apparatus may include a processor having a trusted security zone and a trusted memory communicatively coupled to the trusted security zone to form a TEE. Trusted applications may operate in the TEE. The trusted memory may have a common repository. The apparatus may include memory storing instructions that cause the processor to effectuate operations. The operations may include receiving, from a first trusted application of the trusted applications, a first application data and storing the first application data in the common repository. The operations may also include controlling access to the first application data by a second trusted application of the trusted applications based on a policy module of the TEE. The operations may include communicating an indication of the first application data to a network manager of a network. Based on the indication, the network manager may assign the device to a network slice of the network.

According to another aspect, this disclosure is directed to a method. The method may include receiving a first application data from a first trusted application operating in a TEE of a device. The method may include storing the first application data in a common repository of the TEE and receiving a request to access the first application data from a second trusted application operating in the TEE. The method may also include determining whether the second trusted application has access to the first application data based on a policy module. The method may include based on the second trusted application accessing the first application data, communicating an indication of the first application data to a network manager of a network. Based on the indication, the network manager may assign the device to a network slice of the network.

BRIEF DESCRIPTION OF THE DRAWINGS

In the following description, for purposes of explanation, numerous specific details are set forth in order to provide an understanding of the variations in implementing the disclosed technology. However, the instant disclosure may take many different forms and should not be construed as limited to the examples set forth herein. Where practical, like numbers refer to like elements throughout.

FIG. 2 is an flowchart of an exemplary method for controlling access to data in TEE.

DETAILED DESCRIPTION

Figure 1A:
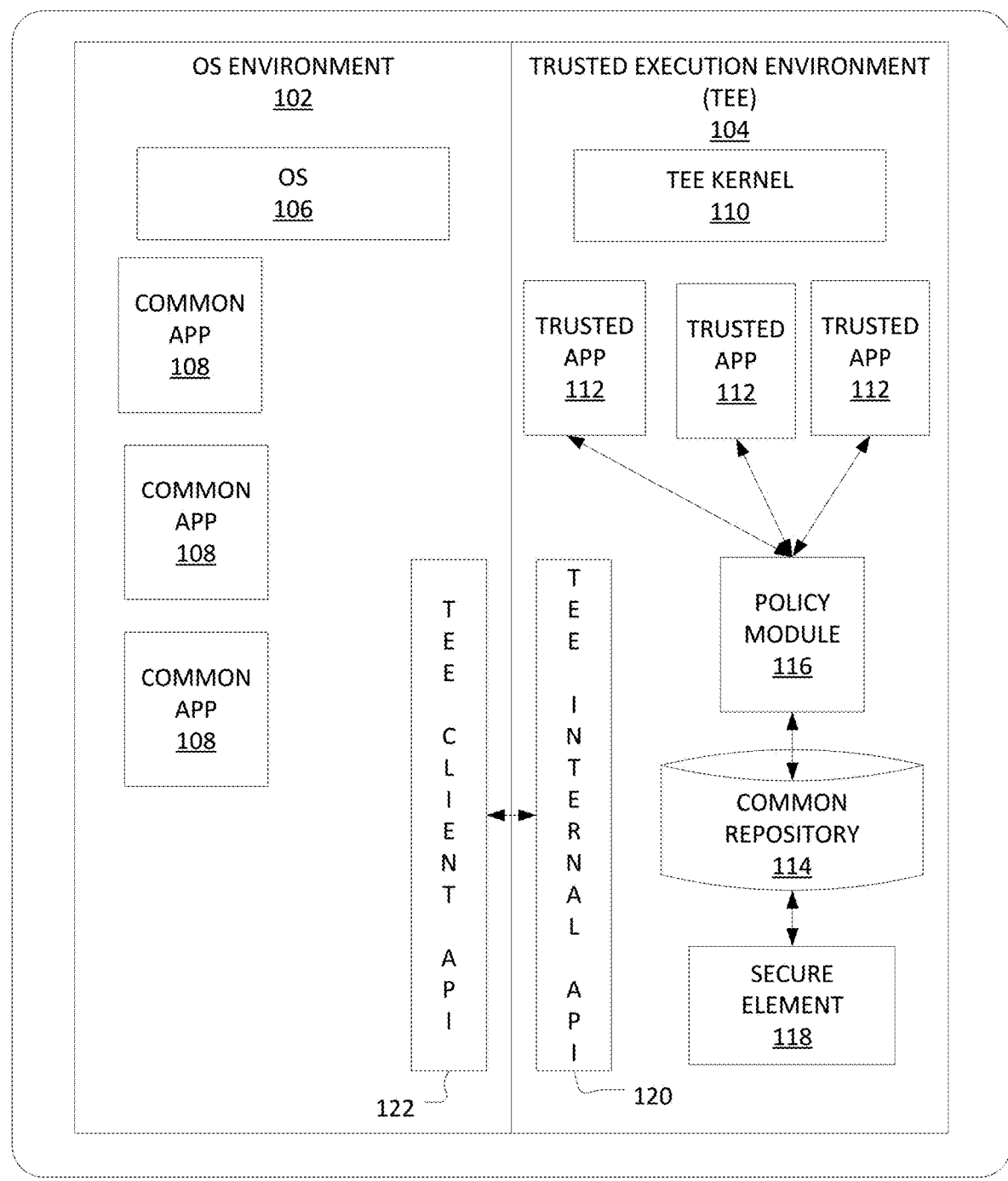
FIG. 1A is a schematic of an architecture of an exemplary device having a TEE.

FIG. 1A illustrates an exemplary architecture of device 100. Generally, device 100 may be a computing device adaptable to connect to and communicate with a network. For example, device 100 may be a user device, such as a smart phone, tablet, desktop computer, or laptop computer.

Device 100 may have multiple computing environments. Each computing environment may compare a set of hardware and software components to support the respective applications that operate in that environment. The environments may include an operating system (OS) environment 102 and a TEE 104. For example, OS environment 102 may be the environment defined by the OS of device 100. This may be referred to as the normal environment or the rich OS environment. For example, OS environment 102 may include OS 106, such as a mobile OS or the like. Additionally, one or more common applications 108, such as client applications may operate within OS environment 102.

TEE 104 may comprise a secure area of a main processor of device 100. It may provide hardware-based isolation from OS environment 102. TEE 104 may be used to isolate and protect code and data loaded within TEE 104 to maintain the confidentiality of such code and data, and to prevent such code or data from being tampered with or otherwise compromised. For example, by restricting which applications may run or access TEE 104, TEE 104 may be protected from interference by malware. For example, access to TEE 104 from outside of TEE 104, such as from OS environment 102 or from another device external to device 100, may be restricted. A TEE kernel 110 may control operations of TEE 104 and elements of TEE 104. For example, TEE 104 may include trusted applications 112 that operate and store data within TEE. For example, a trusted application 112 may be one that requires certain heightened security, such as identification-based access (e.g., fingerprint authorization, voice recognition authorization) and mobile commerce applications (e.g., mobile wallets, peer-to-peer payment technology) may particularly benefit from the heightened security of TEE 104. For example, trusted applications 112 may include applications for interfacing with internet of things (TOT) devices, such as security applications for controlling home security technologies, wearable device applications for interfacing with wearable devices, network connectivity applications for connecting to communication networks, or the like. The type or function of trusted applications 112 may not be what distinguishes trusted applications 112 from common applications 108. The difference may be that trusted applications 112 operate in TEE 104, and common applications 108 operate in OS environment 102.

Common application 108 and trusted applications 112 may generate or store data within device 100. For example, common applications 108 may store data in (or accessible through) OS environment 102, while trusted applications 112 may store data in (or accessible through) TEE 104. Because of the secure nature of TEE 104, each trusted application 112 may have a designated memory for storing its data, such that only that trusted application 112 may access that memory designated to that trusted application 112. Restricting access to trusted-application data to the trusted application 112 from which it originated may have certain security advantages. However, within TEE 104, and with trusted external devices, it may be advantageous to share data generated by a first trusted application 112 with other trusted applications 112 or other external devices.

Thus, TEE 104 may include a common repository 114 in which at least some data generated or stored by trusted applications 112 may be accessible to other trusted applications 112. Access to common repository 114 (and to certain data stored within common repository 114) may be controlled by a policy module 116. For example, policy module 116 may include certain policies (or rules) that restrict access to application data based on one or more factors, such as the identity of a source (e.g., trusted application 112 or external device) that stored application data in common repository 114, the identity of the element (e.g., trusted application 112 or external device) seeking access to the application data in common repository 114, a type of the application data, a location of the application data within common repository 114, or any other characteristic, such as a time of day, a network connection status, a battery power level, which trusted (or common) applications are actively running (as opposed to running in the background of device 100) or the like.

The policies of policy module 116 may include policies from one or more sources. For example, user-preference policies may be those policies selected by a user that dictates what data is being shared and with which elements that data is being shared. User-preference policies may be changed dynamically. That is, a user may change a user-preference policy by updating their preference. Further, these policies may be based on one or more factors or originate in one or more ways. For example, when a user links a wearable device, such as a fitness monitor, to device 100, a prompt may ask a user to indicate which trusted applications 112 (if any) that user wishes to have access to that data and under what circumstances that access should be permitted or denied. For example, a user may indicate that any global positioning system (GPS) information received on device 100 may be shared with another trusted application 112, such as one that facilitates a particular wearable device of the user. For example, by sharing GPS information generated by GPS chip on device 100, the need for a wearable device, such as a fitness device that tracks movement, to have a GPS chip (e.g., to map the user's runs to a geographic map) may be eliminated.

As another example, policies of policy module 116 may include service-agreed rules. A service-agreed rule may be a policy that acceptance of which by the user is required by a service provider to provide that certain service. For example, a service provider may require that access to any data collected or generated by its trusted application 112 be restricted to only other trusted applications 112 of that service provider, or that specific trusted applications 112 (such as those trusted applications 112 of a competitor of that service provider) be specifically excluded from accessing data generated or stored by the service provider's trusted application 112. As another example, a service-agreed rule may be a policy that requires the service provider's trusted application 112 to access certain application data of other trusted applications.

As another example, policies of policy module 116 may include carrier-related policies. For example, a telecommunications carrier may restrict or control access to data from its trusted applications. Conversely, a telecommunications carrier may require, as a condition of providing access to the telecommunications network, access to certain application data of other trusted applications 112. Similarly, a telecommunications carrier may provide incentives for a user to agree to optional carrier-related policies, such as increased quality of service, decreased costs, or other incentives.

As another example, policy module 116 may include healthcare information policies. For example, certain healthcare information may be subject to privacy laws and regulations, such as the Health Insurance Portability and Accountability ACT (HIPAA). This information may have certain legal restrictions that limit how such information may be shared. Additionally or alternatively, certain legal may dictate minimum security measures to protect such information. For trusted application data that includes information subject to such regulations, policies of policy module 116 may limit how such application data is shared, even among trusted applications 112.

Policy module 116 may have a certain hierarchy in which certain policies are applied. For example, if a service-agreed rule requires that certain application data be shared, but a healthcare information policy prohibits sharing that information without a user preference indicating that the user has authorized such information to be shared, then policy module may override the service-agreed rule—which may or may not have an effect on the services provided by that service provider—and deny access to the healthcare information by that trusted application 112. Alternatively or additionally, the user may be prompted to grant the healthcare information-related permissions to eliminate this conflict of policies.

Policy module 116 may directly or indirectly control access to a secure element 118 of TEE 104. For example, secure element 118 may store encryption keys and codes. This information may be used to decrypt or access certain application data stored in common repository 114. Policy module 116 may control access to secure element 118 using the same or different policies as those used to control access to common repository 114.

In certain circumstances, it may be advantageous for TEE 104 and OS environment 102 (or elements within each) to communicate with one another. Thus, device 100 may include application programming interfaces (APIs) to facilitate such communication. For example, within TEE 102 there may exist a TEE internal API 120. Within OS environment 102, there may exist a TEE client API 122. Communications can be facilitated and restricted in according with APIs 120 and 122.

Figure 1B:
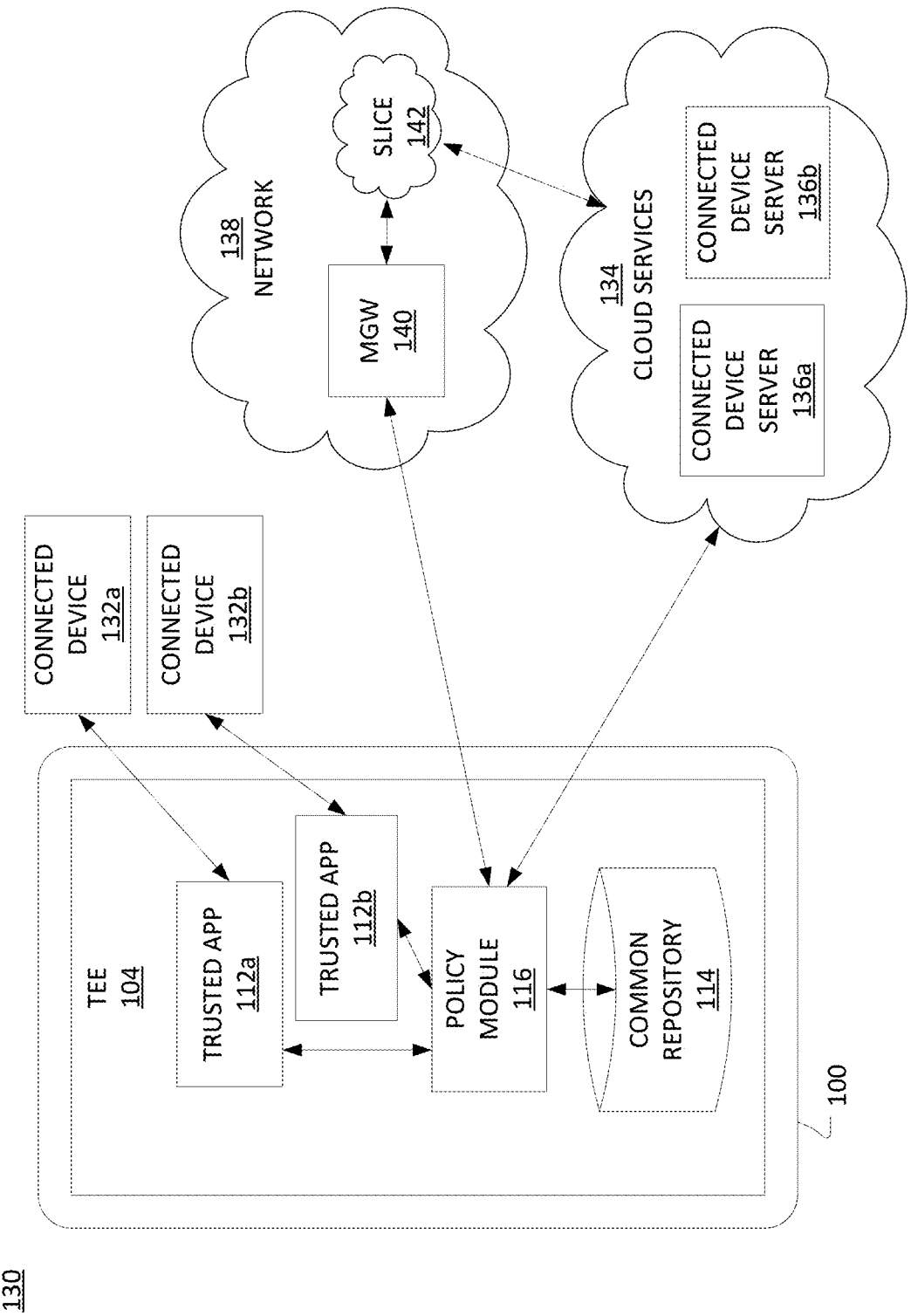
FIG. 1B illustrates an exemplary system that controls access to trusted application data.

FIG. 1B illustrates an exemplary system 130 in which device 100 may operate. For clarity only, device 100 as depicted in FIG. 1B includes less than all of the elements as depicted in FIG. 1A. The lack of depiction of certain elements from one or more of the figures should not be interpreted to indicate that such elements are not present. FIG. 1B illustrates communications between TEE 104 of device 100 and external elements.

As discussed above with respect to FIG. 1A, trusted applications 112 may be affiliated with one or more connected devices 132, such as healthcare monitors, fitness monitors, smartwatches, navigation tools, wearables, implants, or other IOT devices. Such connected devices 132 may link to device 100 via Bluetooth® or NFC technologies, wired connections, or other wireless communications.

In addition to connected devices 132, trusted applications 112 may also be affiliated with one or more cloud services 134. For example, trusted application 112a may be affiliated with connected device 132a and connected-device server 136a, and trusted application 112b may be affiliated with connected device 132b and connected-device server 136b. These elements may, in one or more different combinations, operate to provide or facilitate cloud services 134.

Policy module 116 may also control access to common repository 114 from cloud services 134 and connected-device 136. This may facilitate, if the policies of policy module 116 allow, cloud services 134 to benefit from or access data generated by trusted applications 112 or connected devices 132 that may not be directly linked together. For example, assume that connected device 132a comprises a fitness tracker developed by company A. The fitness tracker works in conjunction with trusted application 112a to provide certain cloud services 134, such as via connected-device server 136a. But if the fitness tracker lacks a GPS chip, and trusted app 112a does not have access to this information, then cloud services 134 provided in conjunction with the fitness tracker may be unable to map, for example, the user's jogging route. However, with the use of a common repository 114, if trusted application 112b (alone or in conjunction with connected device 132b does have access to GPS information), then cloud services 134 provided via trusted application 112a may make use of that GPS information via policy module 116.

The application data stored in common repository 114 may also be used to manage network connections of device 100. Thus, policy module 116 may facilitate access to such information, as permitted by the policies, to network device that facilitates connecting device 100 to a network 138. For example, a network manager, such as a media gateway (MGW) 140 of network 100 may access application data stored in common repository 114. MGW 140 may slice network 100 based on the application data or its metadata, such as metadata indicating what application data is being accessed and by whom, or the like, to provide a network slice 142 for device 100. For example, the design of network slice 142 may depend upon a variety of factors and may be intended to provide support for the specific services device 100 is using, such as cloud services 134. For example, if device 100 is using network 100 for a first service that requires certain requirements (e.g., latency or bandwidth requirements) that differ from the requirements of a second service, network slice 142 may be designed to meet those requirements of the first service, while not necessarily meeting other requirements of network 100 that may be used for another service that device 100 is not using at that time.

FIG. 2 illustrates an exemplary method 200 for controlling access to application data stored in common repository 114. For example, at step 202, method 200 may include first trusted application 112a generating or receiving application data. For example, this data may be received from connected device 132a. Policy module 116 may receive that application data to store in common repository 114. Policy module 116 may decide where to store application data within common repository 114.

At step 204, the first application data may be stored in common repository 114. This storage may be directed or facilitated by policy module 116, which controls access to common repository 114. In an aspect, trusted application 112a may choose to store certain of its application data in common repository while storing other application data in a memory only accessible by trusted application 112a.

At step 206, method 200 may include determining that second trusted application 112b has access to first application data based on policies of policy module 116. These policies may operate as discussed above. This access may be permitted directly through second trusted application 112b, or it may be performed directly from connected-device server 136b, depending upon the particular policies and functionality in that particular implementation. Based on these policies, step 208 may include controlling access to the first application data by the second trusted application.

The results of method 200 may affect the network connections of device 100. For example, certain data may be shared by policy module 116 with MGW 140 or other cloud services to indicate the requirements that network slice 142 must or may meet in order to provide certain services to device 100.

Figure 3:
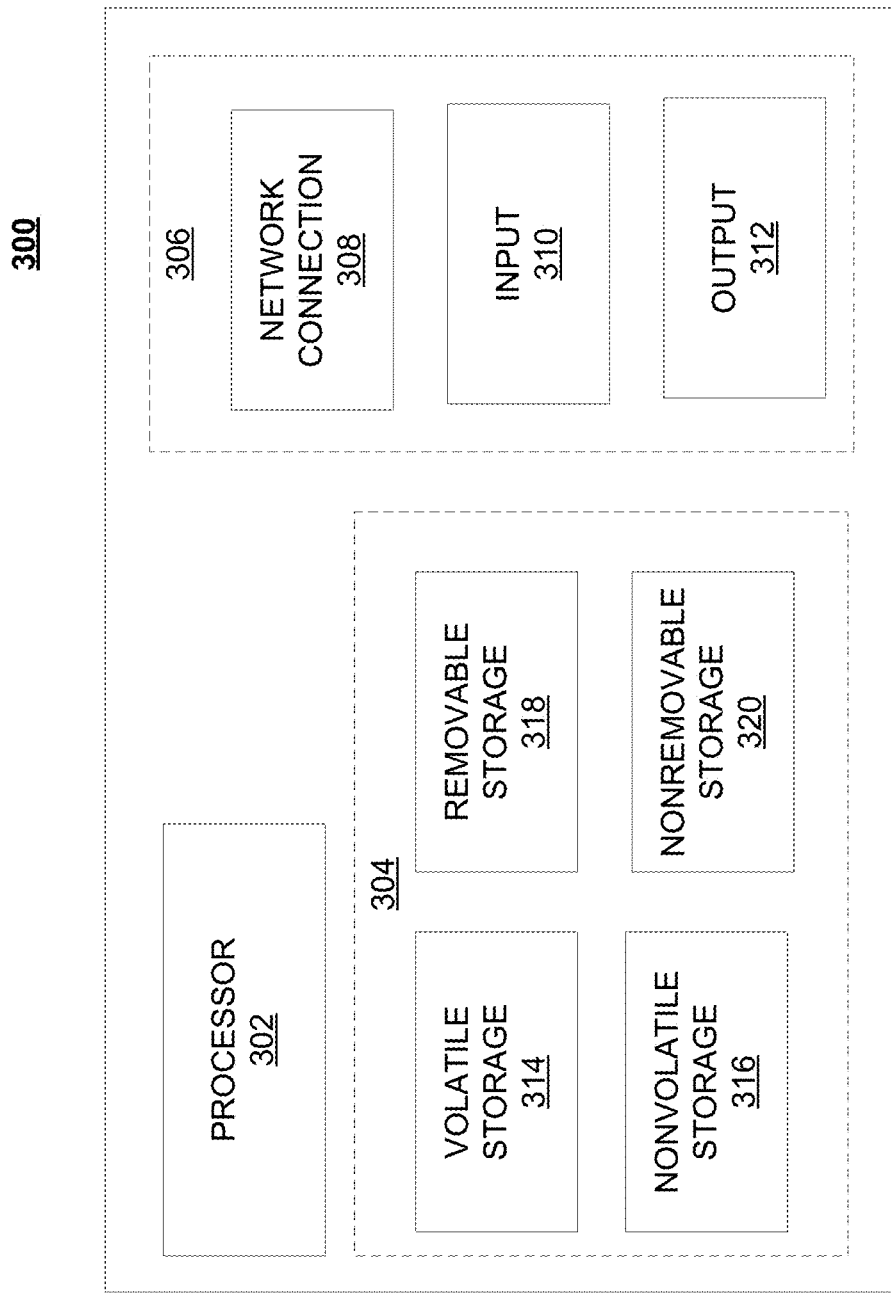
FIG. 3 is a schematic of an exemplary device that may be a component of the system of FIG. 1B.

FIG. 3 is a block diagram of network device 300 that may be connected to or comprise a component of network 100. For example, network device 300 may implement one or more portions of method 200 for placement of network components of application 102. Network device 300 may comprise hardware or a combination of hardware and software. The functionality to facilitate telecommunications via a telecommunications network may reside in one or combination of network devices 300. Network device 300 depicted in FIG. 3 may represent or perform functionality of an appropriate network device 300, or combination of network devices 300, such as, for example, a component or various components of a cellular broadcast system wireless network, a processor, a server, a gateway, a node, a mobile switching center (MSC), a short message service center (SMSC), an ALFS, a gateway mobile location center (GMLC), a radio access network (RAN), a serving mobile location center (SMLC), or the like, or any appropriate combination thereof. It is emphasized that the block diagram depicted in FIG. 3 is exemplary and not intended to imply a limitation to a specific implementation or configuration. Thus, network device 300 may be implemented in a single device or multiple devices (e.g., single server or multiple servers, single gateway or multiple gateways, single controller or multiple controllers). Multiple network entities may be distributed or centrally located. Multiple network entities may communicate wirelessly, via hard wire, or any appropriate combination thereof.

Network device 300 may comprise a processor 302 and a memory 304 coupled to processor 302. Memory 304 may contain executable instructions that, when executed by processor 302, cause processor 302 to effectuate operations associated with mapping wireless signal strength. As evident from the description herein, network device 300 is not to be construed as software per se.

In addition to processor 302 and memory 304, network device 300 may include an input/output system 306. Processor 302, memory 304, and input/output system 306 may be coupled together (coupling not shown in FIG. 3) to allow communications therebetween. Each portion of network device 300 may comprise circuitry for performing functions associated with each respective portion. Thus, each portion may comprise hardware, or a combination of hardware and software. Accordingly, each portion of network device 300 is not to be construed as software per se. Input/output system 306 may be capable of receiving or providing information from or to a communications device or other network entities configured for telecommunications. For example input/output system 306 may include a wireless communications (e.g., 3G/4G/GPS) card. Input/output system 306 may be capable of receiving or sending video information, audio information, control information, image information, data, or any combination thereof. Input/output system 306 may be capable of transferring information with network device 300. In various configurations, input/output system 306 may receive or provide information via any appropriate means, such as, for example, optical means (e.g., infrared), electromagnetic means (e.g., RF, Wi-Fi, Bluetooth®, ZigBee®), acoustic means (e.g., speaker, microphone, ultrasonic receiver, ultrasonic transmitter), or a combination thereof. In an example configuration, input/output system 306 may comprise a Wi-Fi finder, a two-way GPS chipset or equivalent, or the like, or a combination thereof.

Input/output system 306 of network device 300 also may contain a communication connection 308 that allows network device 300 to communicate with other devices, network entities, or the like. Communication connection 308 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 306 also may include an input device 310 such as keyboard, mouse, pen, voice input device, or touch input device. Input/output system 306 may also include an output device 312, such as a display, speakers, or a printer.

Processor 302 may be capable of performing functions associated with telecommunications, such as functions for processing broadcast messages, as described herein. For example, processor 302 may be capable of, in conjunction with any other portion of network device 300, determining a type of broadcast message and acting according to the broadcast message type or content, as described herein.

Memory 304 of network device 300 may comprise a storage medium having a concrete, tangible, physical structure. As is known, a signal does not have a concrete, tangible, physical structure. Memory 304, as well as any computer-readable storage medium described herein, is not to be construed as a signal. Memory 304, as well as any computer-readable storage medium described herein, is not to be construed as a transient signal. Memory 304, as well as any computer-readable storage medium described herein, is not to be construed as a propagating signal. Memory 304, as well as any computer-readable storage medium described herein, is to be construed as an article of manufacture.

Memory 304 may store any information utilized in conjunction with telecommunications. Depending upon the exact configuration or type of processor, memory 304 may include a volatile storage 314 (such as some types of RAM), a nonvolatile storage 316 (such as ROM, flash memory), or a combination thereof. Memory 304 may include additional storage (e.g., a removable storage 318 or a nonremovable storage 320) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by network device 300. Memory 304 may comprise executable instructions that, when executed by processor 302, cause processor 302 to effectuate operations to map signal strengths in an area of interest.

Figure 4:
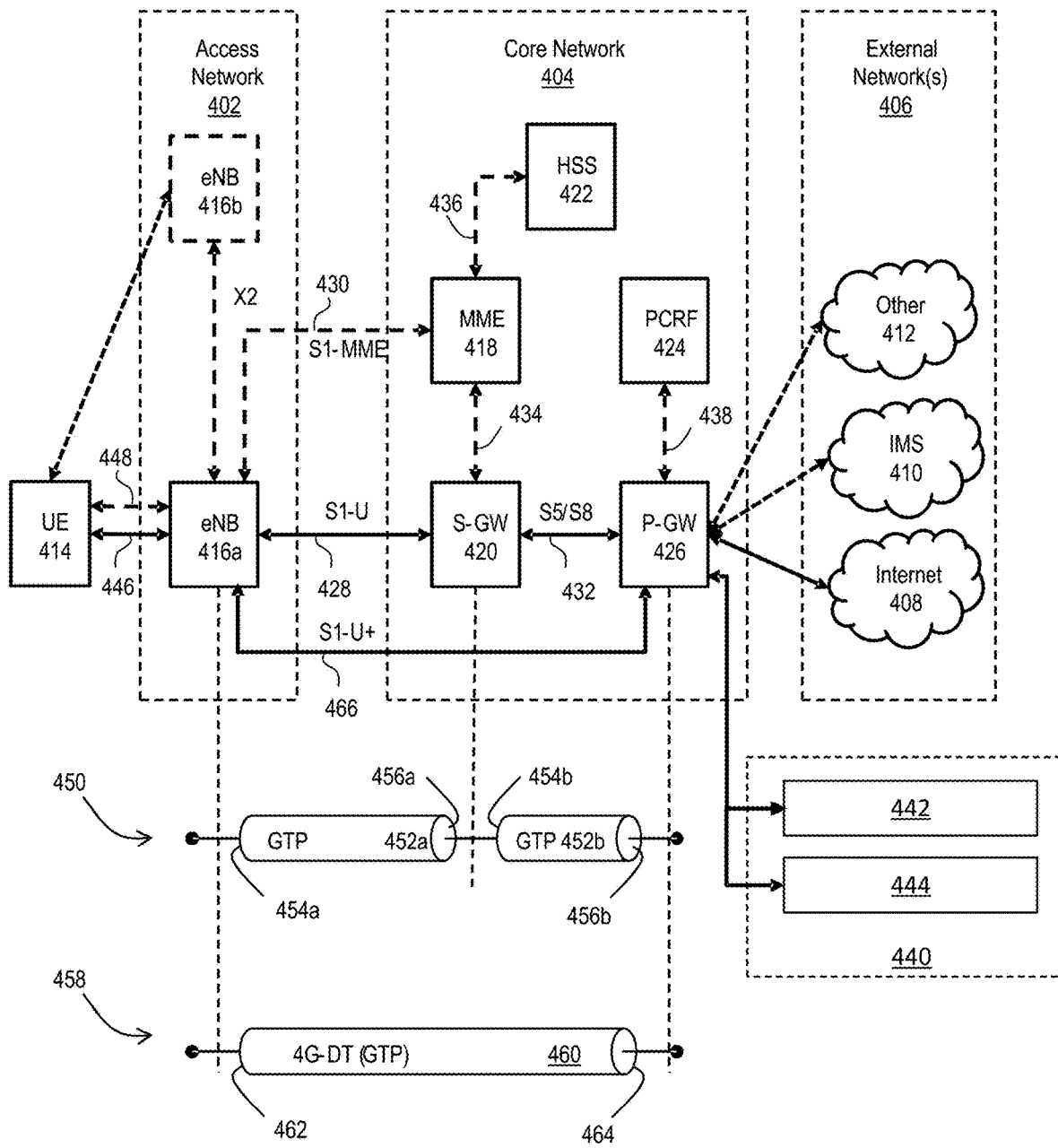
FIG. 4 illustrates a functional block diagram depicting one example of an LTE-EPS network architecture.

FIG. 4 illustrates a functional block diagram depicting one example of an LTE-EPS network architecture 400 that may be at least partially implemented as using virtualized functions. Network architecture 400 disclosed herein is referred to as a modified LTE-EPS architecture 400 to distinguish it from a traditional LTE-EPS architecture.

An example modified LTE-EPS architecture 400 is based at least in part on standards developed by the 3rd Generation Partnership Project (3GPP), with information available at www.3gpp.org. LTE-EPS network architecture 400 may include an access network 402, a core network 404, e.g., an EPC or Common BackBone (CBB) and one or more external networks 406, sometimes referred to as PDN or peer entities. Different external networks 406 can be distinguished from each other by a respective network identifier, e.g., a label according to DNS naming conventions describing an access point to the PDN. Such labels can be referred to as Access Point Names (APN). External networks 406 can include one or more trusted and non-trusted external networks such as an internet protocol (IP) network 408, an IP multimedia subsystem (IMS) network 410, and other networks 412, such as a service network, a corporate network, or the like. In an aspect, access network 402, core network 404, or external network 405 may include or communicate with network 100.

Access network 402 can include an LTE network architecture sometimes referred to as Evolved Universal mobile Telecommunication system Terrestrial Radio Access (E UTRA) and evolved UMTS Terrestrial Radio Access Network (E-UTRAN). Broadly, access network 402 can include one or more communication devices, commonly referred to as UE 414, and one or more wireless access nodes, or base stations 416a, 416b. During network operations, at least one base station 416 communicates directly with UE 414. Base station 416 can be an evolved Node B (e-NodeB), with which UE 414 communicates over the air and wirelessly. UEs 414 can include, without limitation, wireless devices, e.g., satellite communication systems, portable digital assistants (PDAs), laptop computers, tablet devices and other mobile devices (e.g., cellular telephones, smart appliances, and so on). UEs 414 can connect to eNBs 416 when UE 414 is within range according to a corresponding wireless communication technology.

UE 414 generally runs one or more applications that engage in a transfer of packets between UE 414 and one or more external networks 406. Such packet transfers can include one of downlink packet transfers from external network 406 to UE 414, uplink packet transfers from UE 414 to external network 406 or combinations of uplink and downlink packet transfers. Applications can include, without limitation, web browsing, VoIP, streaming media and the like. Each application can pose different Quality of Service (QoS) requirements on a respective packet transfer. Different packet transfers can be served by different bearers within core network 404, e.g., according to parameters, such as the QoS.

Core network 404 uses a concept of bearers, e.g., EPS bearers, to route packets, e.g., IP traffic, between a particular gateway in core network 404 and UE 414. A bearer refers generally to an IP packet flow with a defined QoS between the particular gateway and UE 414. Access network 402, e.g., E UTRAN, and core network 404 together set up and release bearers as required by the various applications. Bearers can be classified in at least two different categories: (i) minimum guaranteed bit rate bearers, e.g., for applications, such as VoIP; and (ii) non-guaranteed bit rate bearers that do not require guarantee bit rate, e.g., for applications, such as web browsing.

In one embodiment, the core network 404 includes various network entities, such as MME 418, SGW 420, Home Subscriber Server (HSS) 422, Policy and Charging Rules Function (PCRF) 424 and PGW 426. In one embodiment, MME 418 comprises a control node performing a control signaling between various equipment and devices in access network 402 and core network 404. The protocols running between UE 414 and core network 404 are generally known as Non-Access Stratum (NAS) protocols.

For illustration purposes only, the terms MME 418, SGW 420, HSS 422 and PGW 426, and so on, can be server devices, but may be referred to in the subject disclosure without the word "server." It is also understood that any form of such servers can operate in a device, system, component, or other form of centralized or distributed hardware and software. It is further noted that these terms and other terms such as bearer paths and/or interfaces are terms that can include features, methodologies, and/or fields that may be described in whole or in part by standards bodies such as the 3GPP. It is further noted that some or all embodiments of the subject disclosure may in whole or in part modify, supplement, or otherwise supersede final or proposed standards published and promulgated by 3GPP.

According to traditional implementations of LTE-EPS architectures, SGW 420 routes and forwards all user data packets. SGW 420 also acts as a mobility anchor for user plane operation during handovers between base stations, e.g., during a handover from first eNB 416a to second eNB 416b as may be the result of UE 414 moving from one area of coverage, e.g., cell, to another. SGW 420 can also terminate a downlink data path, e.g., from external network 406 to UE 414 in an idle state, and trigger a paging operation when downlink data arrives for UE 414. SGW 420 can also be configured to manage and store a context for UE 414, e.g., including one or more of parameters of the IP bearer service and network internal routing information. In addition, SGW 420 can perform administrative functions, e.g., in a visited network, such as collecting information for charging (e.g., the volume of data sent to or received from the user), and/or replicate user traffic, e.g., to support a lawful interception. SGW 420 also serves as the mobility anchor for interworking with other 3GPP technologies such as universal mobile telecommunication system (UMTS).

At any given time, UE 414 is generally in one of three different states: detached, idle, or active. The detached state is typically a transitory state in which UE 414 is powered on but is engaged in a process of searching and registering with network 402. In the active state, UE 414 is registered with access network 402 and has established a wireless connection, e.g., radio resource control (RRC) connection, with eNB 416. Whether UE 414 is in an active state can depend on the state of a packet data session, and whether there is an active packet data session. In the idle state, UE 414 is generally in a power conservation state in which UE 414 typically does not communicate packets. When UE 414 is idle, SGW 420 can terminate a downlink data path, e.g., from one peer entity, and triggers paging of UE 414 when data arrives for UE 414. If UE 414 responds to the page, SGW 420 can forward the IP packet to eNB 416a.

HSS 422 can manage subscription-related information for a user of UE 414. For example, tHSS 422 can store information such as authorization of the user, security requirements for the user, quality of service (QoS) requirements for the user, etc. HSS 422 can also hold information about external networks 406 to which the user can connect, e.g., in the form of an APN of external networks 406. For example, MME 418 can communicate with HSS 422 to determine if UE 414 is authorized to establish a call, e.g., a voice over IP (VoIP) call before the call is established.

PCRF 424 can perform QoS management functions and policy control. PCRF 424 is responsible for policy control decision-making, as well as for controlling the flow-based charging functionalities in a policy control enforcement function (PCEF), which resides in PGW 426. PCRF 424 provides the QoS authorization, e.g., QoS class identifier and bit rates that decide how a certain data flow will be treated in the PCEF and ensures that this is in accordance with the user's subscription profile.

PGW 426 can provide connectivity between the UE 414 and one or more of the external networks 406. In illustrative network architecture 400, PGW 426 can be responsible for IP address allocation for UE 414, as well as one or more of QoS enforcement and flow-based charging, e.g., according to rules from the PCRF 424. PGW 426 is also typically responsible for filtering downlink user IP packets into the different QoS-based bearers. In at least some embodiments, such filtering can be performed based on traffic flow templates. PGW 426 can also perform QoS enforcement, e.g., for guaranteed bit rate bearers. PGW 426 also serves as a mobility anchor for interworking with non-3GPP technologies such as CDMA2000.

Within access network 402 and core network 404 there may be various bearer paths/interfaces, e.g., represented by solid lines 428 and 430. Some of the bearer paths can be referred to by a specific label. For example, solid line 428 can be considered an S1-U bearer and solid line 432 can be considered an S5/S8 bearer according to LTE-EPS architecture standards. Without limitation, reference to various interfaces, such as S1, X2, S5, S8, S11 refer to EPS interfaces. In some instances, such interface designations are combined with a suffix, e.g., a "U" or a "C" to signify whether the interface relates to a "User plane" or a "Control plane." In addition, the core network 404 can include various signaling bearer paths/interfaces, e.g., control plane paths/interfaces represented by dashed lines 430, 434, 436, and 438. Some of the signaling bearer paths may be referred to by a specific label. For example, dashed line 430 can be considered as an Sl-MME signaling bearer, dashed line 434 can be considered as an S11 signaling bearer and dashed line 436 can be considered as an Sha signaling bearer, e.g., according to LTE-EPS architecture standards. The above bearer paths and signaling bearer paths are only illustrated as examples and it should be noted that additional bearer paths and signaling bearer paths may exist that are not illustrated.

Also shown is a novel user plane path/interface, referred to as the S1-U+ interface 466. In the illustrative example, the S1-U+ user plane interface extends between the eNB 416a and PGW 426. Notably, S1-U+ path/interface does not include SGW 420, a node that is otherwise instrumental in configuring and/or managing packet forwarding between eNB 416a and one or more external networks 406 by way of PGW 426. As disclosed herein, the S1-U+ path/interface facilitates autonomous learning of peer transport layer addresses by one or more of the network nodes to facilitate a self-configuring of the packet forwarding path. In particular, such self-configuring can be accomplished during handovers in most scenarios so as to reduce any extra signaling load on the S/PGWs 420, 426 due to excessive handover events.

In some embodiments, PGW 426 is coupled to storage device 440, shown in phantom. Storage device 440 can be integral to one of the network nodes, such as PGW 426, for example, in the form of internal memory and/or disk drive. It is understood that storage device 440 can include registers suitable for storing address values. Alternatively or in addition, storage device 440 can be separate from PGW 426, for example, as an external hard drive, a flash drive, and/or network storage.

Storage device 440 selectively stores one or more values relevant to the forwarding of packet data. For example, storage device 440 can store identities and/or addresses of network entities, such as any of network nodes 418, 420, 422, 424, and 426, eNBs 416 and/or UE 414. In the illustrative example, storage device 440 includes a first storage location 442 and a second storage location 444. First storage location 442 can be dedicated to storing a Currently Used Downlink address value 442. Likewise, second storage location 444 can be dedicated to storing a Default Downlink Forwarding address value 444. PGW 426 can read and/or write values into either of storage locations 442, 444, for example, managing Currently Used Downlink Forwarding address value 442 and Default Downlink Forwarding address value 444 as disclosed herein.

In some embodiments, the Default Downlink Forwarding address for each EPS bearer is the SGW S5-U address for each EPS Bearer. The Currently Used Downlink Forwarding address" for each EPS bearer in PGW 426 can be set every time when PGW 426 receives an uplink packet, e.g., a GTP-U uplink packet, with a new source address for a corresponding EPS bearer. When UE 414 is in an idle state, the "Current Used Downlink Forwarding address" field for each EPS bearer of UE 414 can be set to a "null" or other suitable value.

In some embodiments, the Default Downlink Forwarding address is only updated when PGW 426 receives a new SGW S5-U address in a predetermined message or messages. For example, the Default Downlink Forwarding address is only updated when PGW 426 receives one of a Create Session Request, Modify Bearer Request and Create Bearer Response messages from SGW 420.

As values 442, 444 can be maintained and otherwise manipulated on a per bearer basis, it is understood that the storage locations can take the form of tables, spreadsheets, lists, and/or other data structures generally well understood and suitable for maintaining and/or otherwise manipulate forwarding addresses on a per bearer basis.

It should be noted that access network 402 and core network 404 are illustrated in a simplified block diagram in FIG. 4. In other words, either or both of access network 402 and the core network 404 can include additional network elements that are not shown, such as various routers, switches and controllers. In addition, although FIG. 4 illustrates only a single one of each of the various network elements, it should be noted that access network 402 and core network 404 can include any number of the various network elements. For example, core network 404 can include a pool (i.e., more than one) of MMEs 418, SGWs 420 or PGWs 426.

In the illustrative example, data traversing a network path between UE 414, eNB 416a, SGW 420, PGW 426 and external network 406 may be considered to constitute data transferred according to an end-to-end IP service. However, for the present disclosure, to properly perform establishment management in LTE-EPS network architecture 400, the core network, data bearer portion of the end-to-end IP service is analyzed.

An establishment may be defined herein as a connection set up request between any two elements within LTE-EPS network architecture 400. The connection set up request may be for user data or for signaling. A failed establishment may be defined as a connection set up request that was unsuccessful. A successful establishment may be defined as a connection set up request that was successful.

In one embodiment, a data bearer portion comprises a first portion (e.g., a data radio bearer 446) between UE 414 and eNB 416a, a second portion (e.g., an S1 data bearer 428) between eNB 416a and SGW 420, and a third portion (e.g., an S5/S8 bearer 432) between SGW 420 and PGW 426. Various signaling bearer portions are also illustrated in FIG. 4. For example, a first signaling portion (e.g., a signaling radio bearer 448) between UE 414 and eNB 416a, and a second signaling portion (e.g., S1 signaling bearer 430) between eNB 416a and MME 418.

In at least some embodiments, the data bearer can include tunneling, e.g., IP tunneling, by which data packets can be forwarded in an encapsulated manner, between tunnel endpoints. Tunnels, or tunnel connections can be identified in one or more nodes of network 100, e.g., by one or more of tunnel endpoint identifiers, an IP address and a user datagram protocol port number. Within a particular tunnel connection, payloads, e.g., packet data, which may or may not include protocol related information, are forwarded between tunnel endpoints.

An example of first tunnel solution 450 includes a first tunnel 452a between two tunnel endpoints 454a and 456a, and a second tunnel 452b between two tunnel endpoints 454b and 456b. In the illustrative example, first tunnel 452a is established between eNB 416a and SGW 420. Accordingly, first tunnel 452a includes a first tunnel endpoint 454a corresponding to an S1-U address of eNB 416a (referred to herein as the eNB S1-U address), and second tunnel endpoint 456a corresponding to an S1-U address of SGW 420 (referred to herein as the SGW S1-U address). Likewise, second tunnel 452b includes first tunnel endpoint 454b corresponding to an S5-U address of SGW 420 (referred to herein as the SGW S5-U address), and second tunnel endpoint 456b corresponding to an S5-U address of PGW 426 (referred to herein as the PGW S5-U address).

In at least some embodiments, first tunnel solution 450 is referred to as a two tunnel solution, e.g., according to the GPRS Tunneling Protocol User Plane (GTPv1-U based), as described in 3GPP specification TS 29.281, incorporated herein in its entirety. It is understood that one or more tunnels are permitted between each set of tunnel end points. For example, each subscriber can have one or more tunnels, e.g., one for each PDP context that they have active, as well as possibly having separate tunnels for specific connections with different quality of service requirements, and so on.

An example of second tunnel solution 458 includes a single or direct tunnel 460 between tunnel endpoints 462 and 464. In the illustrative example, direct tunnel 460 is established between eNB 416a and PGW 426, without subjecting packet transfers to processing related to SGW 420. Accordingly, direct tunnel 460 includes first tunnel endpoint 462 corresponding to the eNB S1-U address, and second tunnel endpoint 464 corresponding to the PGW S5-U address. Packet data received at either end can be encapsulated into a payload and directed to the corresponding address of the other end of the tunnel. Such direct tunneling avoids processing, e.g., by SGW 420 that would otherwise relay packets between the same two endpoints, e.g., according to a protocol, such as the GTP-U protocol.

In some scenarios, direct tunneling solution 458 can forward user plane data packets between eNB 416a and PGW 426, by way of SGW 420. That is, SGW 420 can serve a relay function, by relaying packets between two tunnel endpoints 416a, 426. In other scenarios, direct tunneling solution 458 can forward user data packets between eNB 416a and PGW 426, by way of the S1 U+ interface, thereby bypassing SGW 420.

Generally, UE 414 can have one or more bearers at any one time. The number and types of bearers can depend on applications, default requirements, and so on. It is understood that the techniques disclosed herein, including the configuration, management and use of various tunnel solutions 450, 458, can be applied to the bearers on an individual bases. That is, if user data packets of one bearer, say a bearer associated with a VoIP service of UE 414, then the forwarding of all packets of that bearer are handled in a similar manner. Continuing with this example, the same UE 414 can have another bearer associated with it through the same eNB 416a. This other bearer, for example, can be associated with a relatively low rate data session forwarding user data packets through core network 404 simultaneously with the first bearer. Likewise, the user data packets of the other bearer are also handled in a similar manner, without necessarily following a forwarding path or solution of the first bearer. Thus, one of the bearers may be forwarded through direct tunnel 458; whereas, another one of the bearers may be forwarded through a two-tunnel solution 450.

Figure 5:
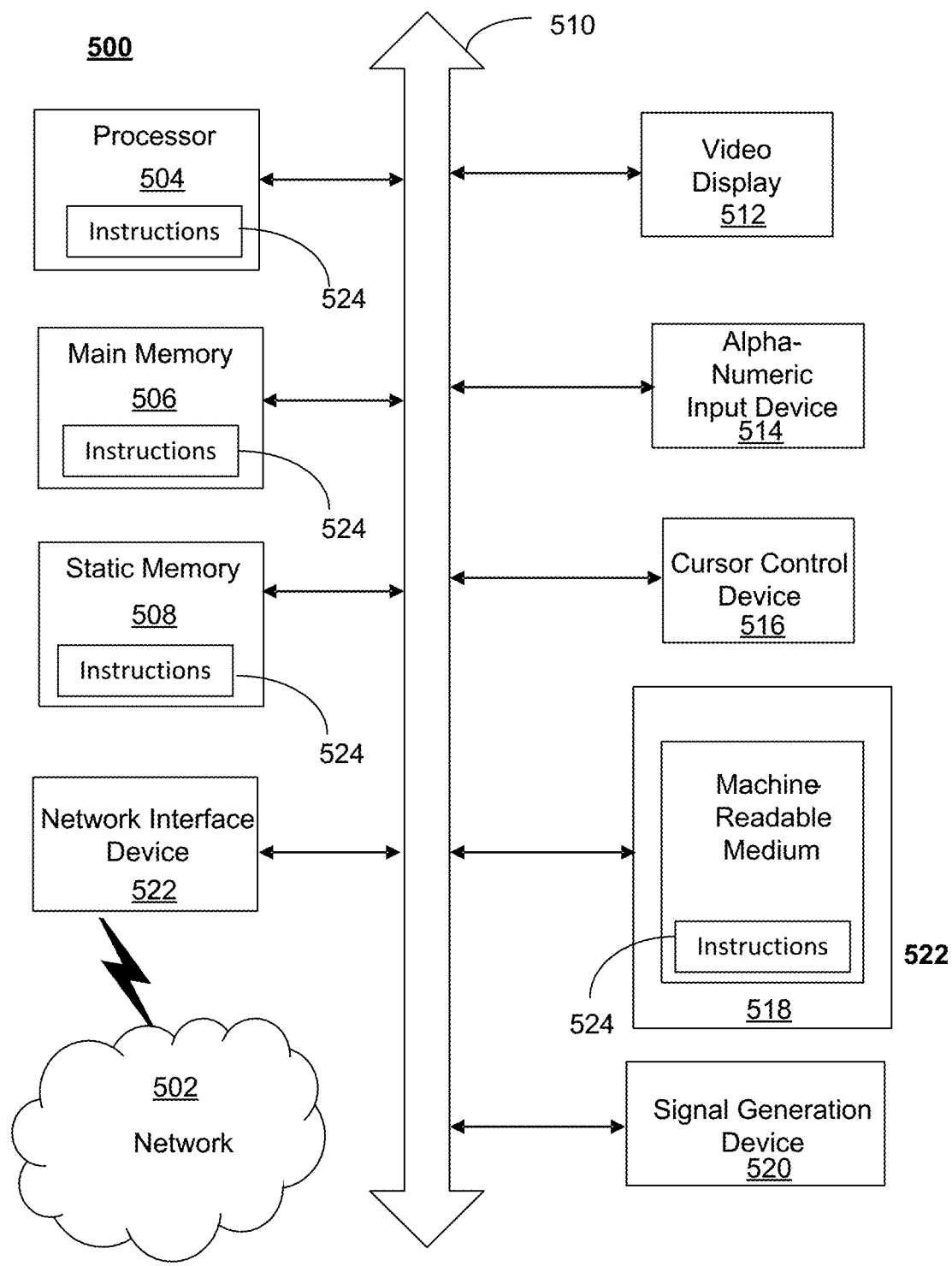
FIG. 5 depicts an exemplary diagrammatic representation of a machine in the form of a computer system 500

FIG. 5 depicts an exemplary diagrammatic representation of a machine in the form of a computer system 500 within which a set of instructions, when executed, may cause the machine to perform any one or more of the methods described above. One or more instances of the machine can operate, for example, as processor 302, UE 414, eNB 416, MME 418, SGW 420, HSS 422, PCRF 424, PGW 426 and other devices of FIGS. 1, 2, and 4. In some embodiments, the machine may be connected (e.g., using a network 502) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

Computer system 500 may include a processor (or controller) 504 (e.g., a central processing unit (CPU)), a graphics processing unit (GPU, or both), a main memory 506 and a static memory 508, which communicate with each other via a bus 510. The computer system 500 may further include a display unit 512 (e.g., a liquid crystal display (LCD), a flat panel, or a solid state display). Computer system 500 may include an input device 514 (e.g., a keyboard), a cursor control device 516 (e.g., a mouse), a disk drive unit 518, a signal generation device 520 (e.g., a speaker or remote control) and a network interface device 522. In distributed environments, the embodiments described in the subject disclosure can be adapted to utilize multiple display units 512 controlled by two or more computer systems 500. In this configuration, presentations described by the subject disclosure may in part be shown in a first of display units 512, while the remaining portion is presented in a second of display units 512.

The disk drive unit 518 may include a tangible computer-readable storage medium 524 on which is stored one or more sets of instructions (e.g., software 526) embodying any one or more of the methods or functions described herein, including those methods illustrated above. Instructions 526 may also reside, completely or at least partially, within main memory 506, static memory 508, or within processor 504 during execution thereof by the computer system 500. Main memory 506 and processor 504 also may constitute tangible computer-readable storage media.

Figure 6:
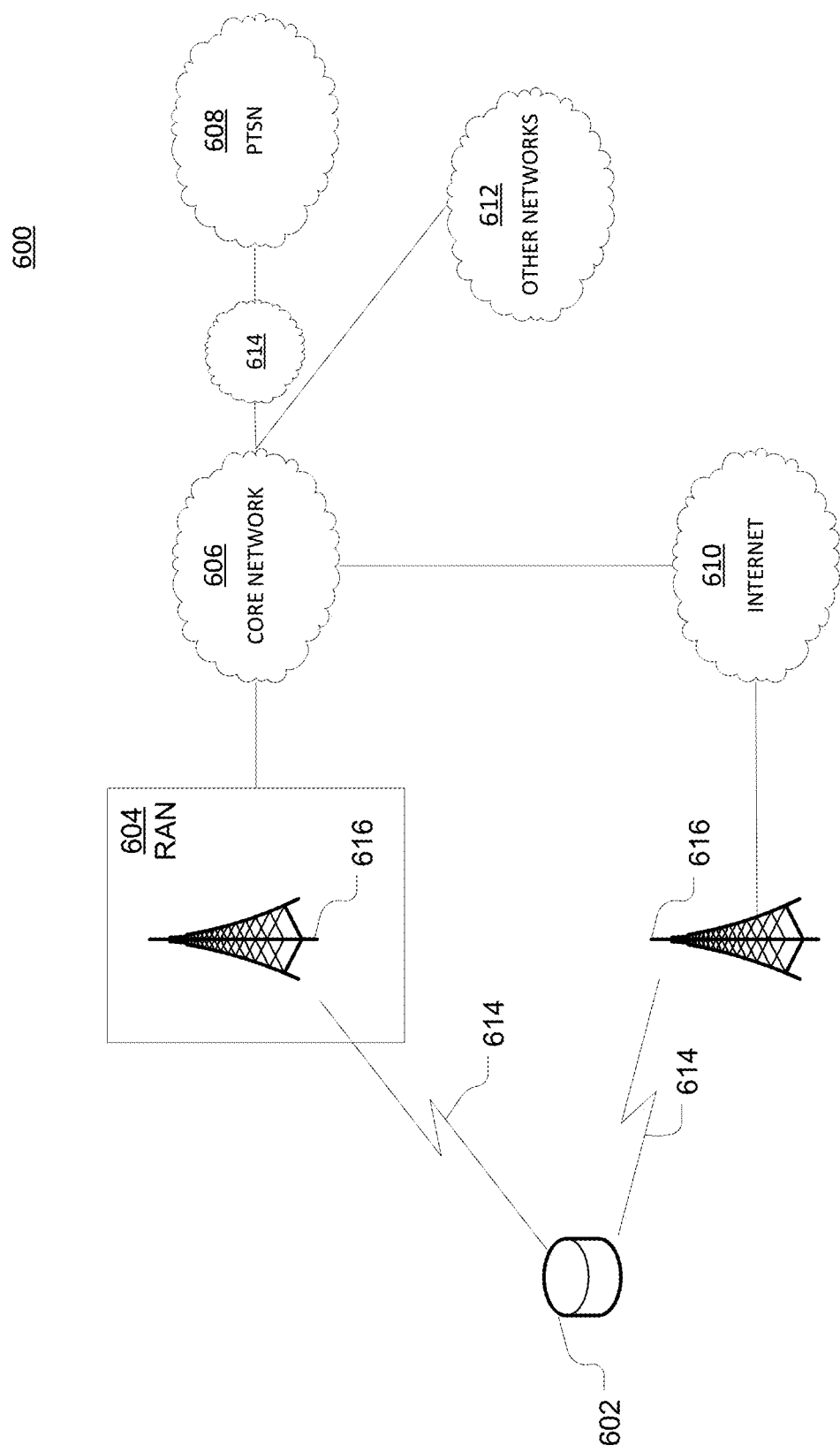
FIG. 6 is a diagram of an exemplary telecommunications system in which the disclosed systems or methods may be implemented.

As shown in FIG. 6, telecommunication system 600 may include wireless transmit/receive units (WTRUs) 602, a RAN 604, a core network 606, a public switched telephone network (PSTN) 608, the Internet 610, or other networks 612, though it will be appreciated that the disclosed examples contemplate any number of WTRUs, base stations, networks, or network elements. Each WTRU 602 may be any type of device configured to operate or communicate in a wireless environment. For example, a WTRU may comprise a mobile device, network device 300, or the like, or any combination thereof. By way of example, WTRUs 602 may be configured to transmit or receive wireless signals and may include a UE, a mobile station, a mobile device, a fixed or mobile subscriber unit, a pager, a cellular telephone, a PDA, a smartphone, a laptop, a netbook, a personal computer, a wireless sensor, consumer electronics, or the like. WTRUs 602 may be configured to transmit or receive wireless signals over an air interface 614.

Telecommunication system 600 may also include one or more base stations 616. Each of base stations 616 may be any type of device configured to wirelessly interface with at least one of the WTRUs 602 to facilitate access to one or more communication networks, such as core network 606, PTSN 608, Internet 610, or other networks 612. By way of example, base stations 616 may be a base transceiver station (BTS), a Node-B, an eNode B, a Home Node B, a Home eNode B, a site controller, an access point (AP), a wireless router, or the like. While base stations 616 are each depicted as a single element, it will be appreciated that base stations 616 may include any number of interconnected base stations or network elements.

RAN 604 may include one or more base stations 616, along with other network elements (not shown), such as a base station controller (BSC), a radio network controller (RNC), or relay nodes. One or more base stations 616 may be configured to transmit or receive wireless signals within a particular geographic region, which may be referred to as a cell (not shown). The cell may further be divided into cell sectors. For example, the cell associated with base station 616 may be divided into three sectors such that base station 616 may include three transceivers: one for each sector of the cell. In another example, base station 616 may employ multiple-input multiple-output (MIMO) technology and, therefore, may utilize multiple transceivers for each sector of the cell.

Base stations 616 may communicate with one or more of WTRUs 602 over air interface 614, which may be any suitable wireless communication link (e.g., RF, microwave, infrared (IR), ultraviolet (UV), or visible light). Air interface 614 may be established using any suitable radio access technology (RAT).

More specifically, as noted above, telecommunication system 600 may be a multiple access system and may employ one or more channel access schemes, such as CDMA, TDMA, FDMA, OFDMA, SC-FDMA, or the like. For example, base station 616 in RAN 604 and WTRUs 602 connected to RAN 604 may implement a radio technology such as Universal Mobile Telecommunications System (UMTS) Terrestrial Radio Access (UTRA) that may establish air interface 614 using wideband CDMA (WCDMA). WCDMA may include communication protocols, such as High-Speed Packet Access (HSPA) or Evolved HSPA (HSPA+). HSPA may include High-Speed Downlink Packet Access (HSDPA) or High-Speed Uplink Packet Access (HSUPA).

As another example base station 616 and WTRUs 602 that are connected to RAN 604 may implement a radio technology such as Evolved UMTS Terrestrial Radio Access (E-UTRA), which may establish air interface 614 using LTE or LTE-Advanced (LTE-A).

Optionally base station 616 and WTRUs 602 connected to RAN 604 may implement radio technologies such as IEEE 602.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), GSM, Enhanced Data rates for GSM Evolution (EDGE), GSM EDGE (GERAN), or the like.

Base station 616 may be a wireless router, Home Node B, Home eNode B, or access point, for example, and may utilize any suitable RAT for facilitating wireless connectivity in a localized area, such as a place of business, a home, a vehicle, a campus, or the like. For example, base station 616 and associated WTRUs 602 may implement a radio technology such as IEEE 602.11 to establish a wireless local area network (WLAN). As another example, base station 616 and associated WTRUs 602 may implement a radio technology such as IEEE 602.15 to establish a wireless personal area network (WPAN). In yet another example, base station 616 and associated WTRUs 602 may utilize a cellular-based RAT (e.g., WCDMA, CDMA2000, GSM, LTE, LTE-A, etc.) to establish a picocell or femtocell. As shown in FIG. 6, base station 616 may have a direct connection to Internet 610. Thus, base station 616 may not be required to access Internet 610 via core network 606.

RAN 604 may be in communication with core network 606, which may be any type of network configured to provide voice, data, applications, and/or voice over internet protocol (VoIP) services to one or more WTRUs 602. For example, core network 606 may provide call control, billing services, mobile location-based services, pre-paid calling, Internet connectivity, video distribution or high-level security functions, such as user authentication. Although not shown in FIG. 6, it will be appreciated that RAN 604 or core network 606 may be in direct or indirect communication with other RANs that employ the same RAT as RAN 604 or a different RAT. For example, in addition to being connected to RAN 604, which may be utilizing an E-UTRA radio technology, core network 606 may also be in communication with another RAN (not shown) employing a GSM radio technology.

Core network 606 may also serve as a gateway for WTRUs 602 to access PSTN 608, Internet 610, or other networks 612. PSTN 608 may include circuit-switched telephone networks that provide plain old telephone service (POTS). For LTE core networks, core network 606 may use IMS core 614 to provide access to PSTN 608. Internet 610 may include a global system of interconnected computer networks or devices that use common communication protocols, such as the transmission control protocol (TCP), user datagram protocol (UDP), or IP in the TCP/IP internet protocol suite. Other networks 612 may include wired or wireless communications networks owned or operated by other service providers. For example, other networks 612 may include another core network connected to one or more RANs, which may employ the same RAT as RAN 604 or a different RAT.

Some or all WTRUs 602 in telecommunication system 600 may include multi-mode capabilities. That is, WTRUs 602 may include multiple transceivers for communicating with different wireless networks over different wireless links. For example, one or more WTRUs 602 may be configured to communicate with base station 616, which may employ a cellular-based radio technology, and with base station 616, which may employ an IEEE 802 radio technology.

Figure 7:
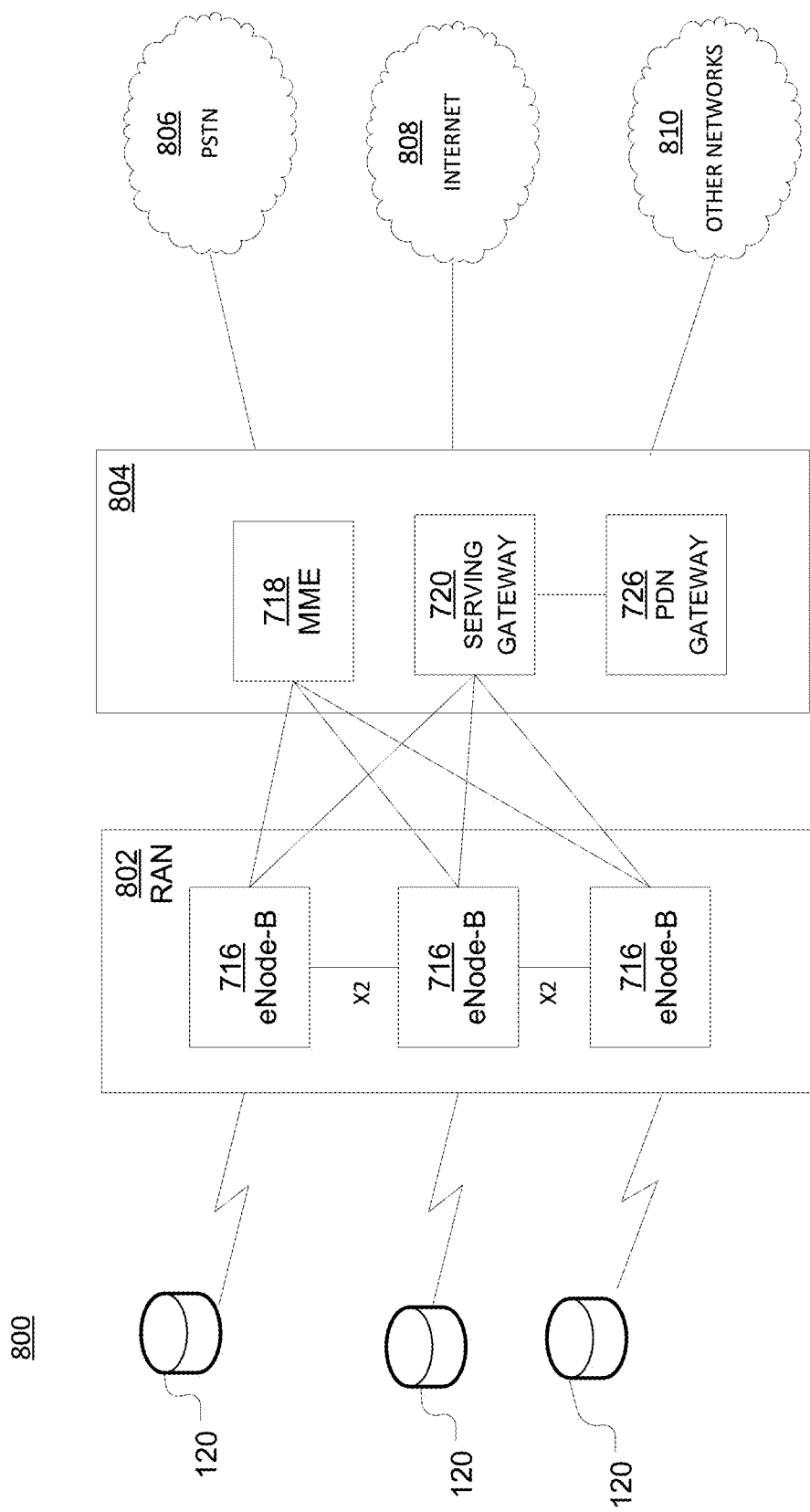
FIG. 7 is an example system diagram of a radio access network and a core network upon which an application may be deployed using the disclosed systems or methods.

FIG. 7 is an example system 700 including RAN 604 and core network 606. As noted above, RAN 604 may employ an E-UTRA radio technology to communicate with WTRUs 602 over air interface 614. RAN 604 may also be in communication with core network 606.

RAN 604 may include any number of eNode-Bs 702 while remaining consistent with the disclosed technology. One or more eNode-Bs 702 may include one or more transceivers for communicating with the WTRUs 602 over air interface 614. Optionally, eNode-Bs 702 may implement MIMO technology. Thus, one of eNode-Bs 702, for example, may use multiple antennas to transmit wireless signals to, or receive wireless signals from, one of WTRUs 602.

Each of eNode-Bs 702 may be associated with a particular cell (not shown) and may be configured to handle radio resource management decisions, handover decisions, scheduling of users in the uplink or downlink, or the like. As shown in FIG. 7 eNode-Bs 702 may communicate with one another over an X2 interface.

Core network 606 shown in FIG. 7 may include a mobility management gateway or entity (MME) 704, a serving gateway 706, or a packet data network (PDN) gateway 708. While each of the foregoing elements are depicted as part of core network 606, it will be appreciated that any one of these elements may be owned or operated by an entity other than the core network operator.

MME 704 may be connected to each of eNode-Bs 702 in RAN 604 via an S1 interface and may serve as a control node. For example, MME 704 may be responsible for authenticating users of WTRUs 602, bearer activation or deactivation, selecting a particular serving gateway during an initial attach of WTRUs 602, or the like. MME 704 may also provide a control plane function for switching between RAN 604 and other RANs (not shown) that employ other radio technologies, such as GSM or WCDMA.

Serving gateway 706 may be connected to each of eNode-Bs 702 in RAN 604 via the S1 interface. Serving gateway 706 may generally route or forward user data packets to or from the WTRUs 602. Serving gateway 706 may also perform other functions, such as anchoring user planes during inter-eNode B handovers, triggering paging when downlink data is available for WTRUs 602, managing or storing contexts of WTRUs 602, or the like.

Serving gateway 706 may also be connected to PDN gateway 708, which may provide WTRUs 602 with access to packet-switched networks, such as Internet 610, to facilitate communications between WTRUs 602 and IP-enabled devices.

Core network 606 may facilitate communications with other networks. For example, core network 606 may provide WTRUs 602 with access to circuit-switched networks, such as PSTN 608, such as through IMS core 614, to facilitate communications between WTRUs 602 and traditional landline communications devices. In addition, core network 606 may provide the WTRUs 602 with access to other networks 612, which may include other wired or wireless networks that are owned or operated by other service providers.

Figure 8:
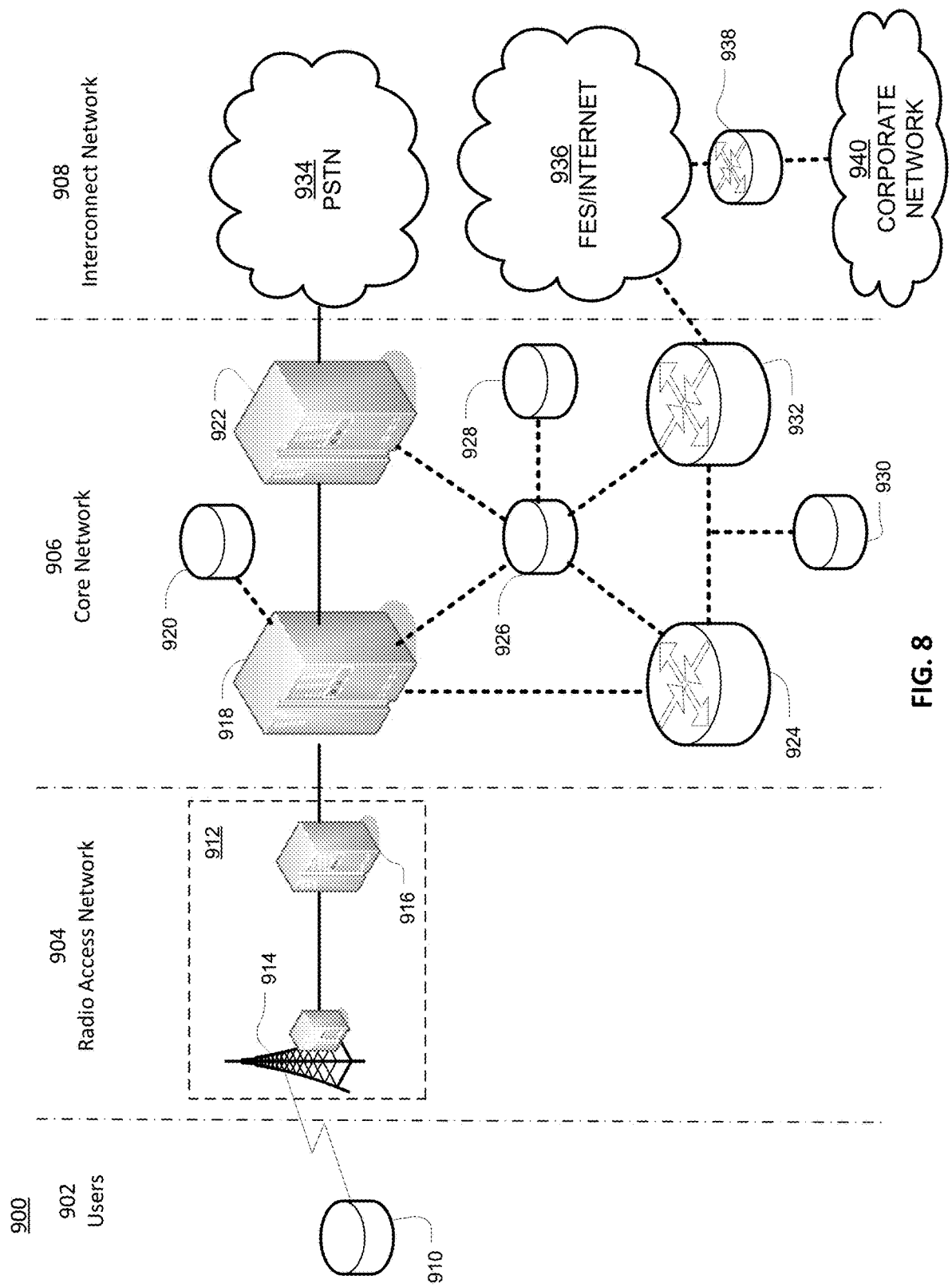
FIG. 8 illustrates an architecture of a typical GPRS network 900 as described herein.

FIG. 8 illustrates an architecture of a typical GPRS network 900 as described herein. The architecture depicted in FIG. 8 may be segmented into four groups: users 902, RAN 904, core network 906, and interconnect network 908. Users 902 comprise a plurality of end users, who each may use one or more devices 910. Note that device 910 is referred to as a mobile subscriber (MS) in the description of network shown in FIG. 8. In an example, device 910 comprises a communications device (e.g., device 120, network device 300, or the like, or any combination thereof). Radio access network 904 comprises a plurality of BSSs such as BSS 912, which includes a BTS 914 and a BSC 916. Core network 906 may include a host of various network elements. As illustrated in FIG. 8, core network 906 may comprise MSC 918, service control point (SCP) 920, gateway MSC (GMSC) 922, SGSN 924, home location register (HLR) 926, authentication center (AuC) 928, domain name system (DNS) server 930, and GGSN 932. Interconnect network 908 may also comprise a host of various networks or other network elements. As illustrated in FIG. 8, interconnect network 908 comprises a PSTN 934, an FES/Internet 936, a firewall 1038, or a corporate network 940.

An MSC can be connected to a large number of BSCs. At MSC 918, for instance, depending on the type of traffic, the traffic may be separated in that voice may be sent to PSTN 934 through GMSC 922, or data may be sent to SGSN 924, which then sends the data traffic to GGSN 932 for further forwarding.

When MSC 918 receives call traffic, for example, from BSC 916, it sends a query to a database hosted by SCP 920, which processes the request and issues a response to MSC 918 so that it may continue call processing as appropriate.

HLR 926 is a centralized database for users to register to the GPRS network. HLR 926 stores static information about the subscribers such as the International Mobile Subscriber Identity (IMSI), subscribed services, or a key for authenticating the subscriber. HLR 926 also stores dynamic subscriber information such as the current location of the MS. Associated with HLR 926 is AuC 928, which is a database that contains the algorithms for authenticating subscribers and includes the associated keys for encryption to safeguard the user input for authentication.

In the following, depending on context, "mobile subscriber" or "MS" sometimes refers to the end user and sometimes to the actual portable device, such as a mobile device, used by an end user of the mobile cellular service. When a mobile subscriber turns on his or her mobile device, the mobile device goes through an attach process by which the mobile device attaches to an SGSN of the GPRS network. In FIG. 8, when MS 910 initiates the attach process by turning on the network capabilities of the mobile device, an attach request is sent by MS 910 to SGSN 924. The SGSN 924 queries another SGSN, to which MS 910 was attached before, for the identity of MS 910. Upon receiving the identity of MS 910 from the other SGSN, SGSN 924 requests more information from MS 910. This information is used to authenticate MS 910 together with the information provided by HLR 926. Once verified, SGSN 924 sends a location update to HLR 926 indicating the change of location to a new SGSN, in this case SGSN 924. HLR 926 notifies the old SGSN, to which MS 910 was attached before, to cancel the location process for MS 910. HLR 926 then notifies SGSN 924 that the location update has been performed. At this time, SGSN 924 sends an Attach Accept message to MS 910, which in turn sends an Attach Complete message to SGSN 924.

Next, MS 910 establishes a user session with the destination network, corporate network 940, by going through a Packet Data Protocol (PDP) activation process. Briefly, in the process, MS 910 requests access to the Access Point Name (APN), for example, UPS.com, and SGSN 924 receives the activation request from MS 910. SGSN 924 then initiates a DNS query to learn which GGSN 932 has access to the UPS.com APN. The DNS query is sent to a DNS server within core network 906, such as DNS server 930, which is provisioned to map to one or more GGSNs in core network 906. Based on the APN, the mapped GGSN 932 can access requested corporate network 940. SGSN 924 then sends to GGSN 932 a Create PDP Context Request message that contains necessary information. GGSN 932 sends a Create PDP Context Response message to SGSN 924, which then sends an Activate PDP Context Accept message to MS 910.

Once activated, data packets of the call made by MS 910 can then go through RAN 904, core network 906, and interconnect network 908, in a particular FES/Internet 936 and firewall 1038, to reach corporate network 940.

Figure 9:
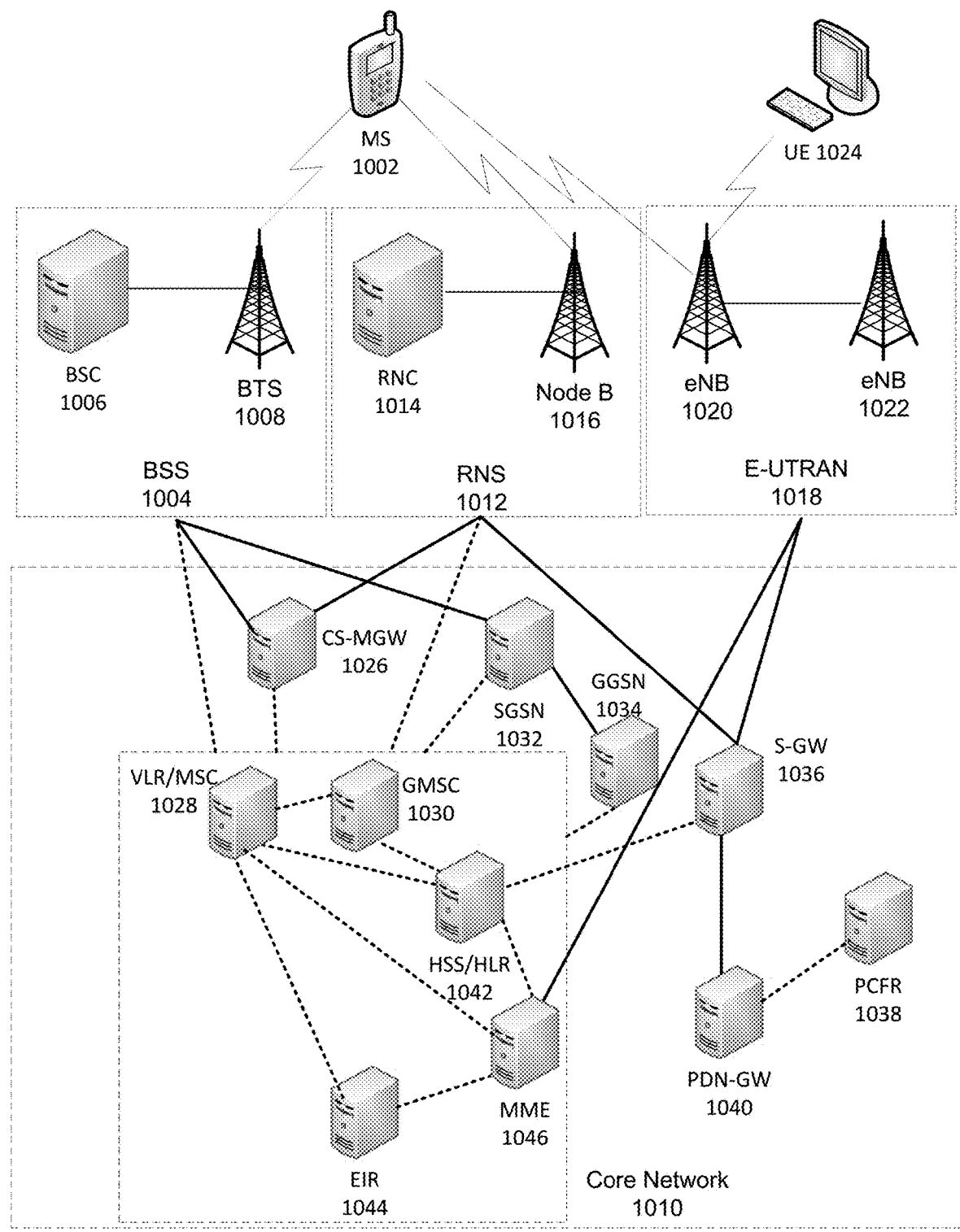
FIG. 9 illustrates a PLMN block diagram view of an example architecture that may be replaced by a telecommunications system.

FIG. 9 illustrates a PLMN block diagram view of an example architecture that may be replaced by a telecommunications system. In FIG. 9, solid lines may represent user traffic signals, and dashed lines may represent support signaling. MS 1002 is the physical equipment used by the PLMN subscriber. For example, device 120, vehicle 103, network device 300, the like, or any combination thereof may serve as MS 1002. MS 1002 may be one of, but not limited to, a cellular telephone, a cellular telephone in combination with another electronic device or any other wireless mobile communication device.

MS 1002 may communicate wirelessly with BSS 1004. BSS 1004 contains BSC 1006 and a BTS 1008. BSS 1004 may include a single BSC 1006/BTS 1008 pair (base station) or a system of BSC/BTS pairs that are part of a larger network. BSS 1004 is responsible for communicating with MS 1002 and may support one or more cells. BSS 1004 is responsible for handling cellular traffic and signaling between MS 1002 and a core network 1010. Typically, BSS 1004 performs functions that include, but are not limited to, digital conversion of speech channels, allocation of channels to mobile devices, paging, or transmission/reception of cellular signals.

Additionally, MS 1002 may communicate wirelessly with RNS 1012. RNS 1012 contains a Radio Network Controller (RNC) 1014 and one or more Nodes B 1016. RNS 1012 may support one or more cells. RNS 1012 may also include one or more RNC 1014/Node B 1016 pairs or alternatively a single RNC 1014 may manage multiple Nodes B 1016. RNS 1012 is responsible for communicating with MS 1002 in its geographically defined area. RNC 1014 is responsible for controlling Nodes B 1016 that are connected to it and is a control element in a UMTS radio access network. RNC 1014 performs functions such as, but not limited to, load control, packet scheduling, handover control, security functions, or controlling MS 1002 access to core network 1010.

An E-UTRA Network (E-UTRAN) 1018 is a RAN that provides wireless data communications for MS 1002 and UE 1024. E-UTRAN 1018 provides higher data rates than traditional UMTS. It is part of the LTE upgrade for mobile networks, and later releases meet the requirements of the International Mobile Telecommunications (IMT) Advanced and are commonly known as a 4G networks. E-UTRAN 1018 may include of series of logical network components such as E-UTRAN Node B (eNB) 1020 and E-UTRAN Node B (eNB) 1022. E-UTRAN 1018 may contain one or more eNBs. User equipment (UE) 1024 may be any mobile device capable of connecting to E-UTRAN 1018 including, but not limited to, a personal computer, laptop, mobile device, wireless router, or other device capable of wireless connectivity to E-UTRAN 1018. The improved performance of the E-UTRAN 1018 relative to a typical UMTS network allows for increased bandwidth, spectral efficiency, and functionality including, but not limited to, voice, high-speed applications, large data transfer or IPTV, while still allowing for full mobility.

Typically MS 1002 may communicate with any or all of BSS 1004, RNS 1012, or E-UTRAN 1018. In a illustrative system, each of BSS 1004, RNS 1012, and E-UTRAN 1018 may provide MS 1002 with access to core network 1010. Core network 1010 may include of a series of devices that route data and communications between end users. Core network 1010 may provide network service functions to users in the circuit switched (CS) domain or the packet switched (PS) domain. The CS domain refers to connections in which dedicated network resources are allocated at the time of connection establishment and then released when the connection is terminated. The PS domain refers to communications and data transfers that make use of autonomous groupings of bits called packets. Each packet may be routed, manipulated, processed or handled independently of all other packets in the PS domain and does not require dedicated network resources.

The circuit-switched MGW function (CS-MGW) 1026 is part of core network 1010, and interacts with VLR/MSC server 1028 and GMSC server 1030 in order to facilitate core network 1010 resource control in the CS domain. Functions of CS-MGW 1026 include, but are not limited to, media conversion, bearer control, payload processing or other mobile network processing such as handover or anchoring. CS-MGW 1026 may receive connections to MS 1002 through BSS 1004 or RNS 1012.

SGSN 1032 stores subscriber data regarding MS 1002 in order to facilitate network functionality. SGSN 1032 may store subscription information such as, but not limited to, the IMSI, temporary identities, or PDP addresses. SGSN 1032 may also store location data such as, but not limited to, GGSN address for each GGSN 1034 where an active PDP exists. GGSN 1034 may implement a location register function to store subscriber data it receives from SGSN 1032 such as subscription or location data.

Serving gateway (S-GW) 1036 is an interface which provides connectivity between E-UTRAN 1018 and core network 1010. Functions of S-GW 1036 include, but are not limited to, packet routing, packet forwarding, transport level packet processing, or user plane mobility anchoring for inter-network mobility. PCRF 1038 uses information gathered from P-GW 1036, as well as other sources, to make applicable policy and charging decisions related to data flows, network resources or other network administration functions. PDN gateway (PDN-GW) 1040 may provide user-to-services connectivity functionality including, but not limited to, GPRS/EPC network anchoring, bearer session anchoring and control, or IP address allocation for PS domain connections.

HSS 1042 is a database for user information and stores subscription data regarding MS 1002 or UE 1024 for handling calls or data sessions. Networks may contain one HSS 1042 or more if additional resources are required. Example data stored by HSS 1042 include, but is not limited to, user identification, numbering or addressing information, security information, or location data. HSS 1042 may also provide call or session establishment procedures in both the PS and CS domains.

VLR/MSC Server 1028 provides user location functionality. When MS 1002 enters a new network location, it begins a registration procedure. A MSC server for that location transfers the location data to the VLR for the area. A VLR and MSC server may be located in the same computing environment, as is shown by VLR/MSC server 1028, or alternatively may be located in separate computing environments. A VLR may contain, but is not limited to, user information such as the IMSI, the Temporary Mobile Station Identity (TMSI), the Local Mobile Station Identity (LMSI), the last known location of the mobile station, or the SGSN where the mobile station was previously registered. The MSC server may contain information such as, but not limited to, procedures for MS 1002 registration or procedures for handover of MS 1002 to a different section of core network 1010. GMSC server 1030 may serve as a connection to alternate GMSC servers for other MSs in larger networks.

EIR 1044 is a logical element which may store the IMEI for MS 1002. User equipment may be classified as either "white listed" or "black listed" depending on its status in the network. If MS 1002 is stolen and put to use by an unauthorized user, it may be registered as "black listed" in EIR 1044, preventing its use on the network. A MME 1046 is a control node which may track MS 1002 or UE 1024 if the devices are idle. Additional functionality may include the ability of MME 1046 to contact idle MS 1002 or UE 1024 if retransmission of a previous session is required.

While examples of a telecommunications system in which packages can be monitored have been described in connection with various computing devices/processors, the underlying concepts may be applied to any computing device, processor, or system capable of facilitating a telecommunications system. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes an device for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language, and may be combined with hardware implementations.

The methods and devices associated with a telecommunications system as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an device for implementing telecommunications as described herein. When implemented on a general-purpose processor, the program code combines with the processor to provide a unique device that operates to invoke the functionality of a telecommunications system.

While a telecommunications system has been described in connection with the various examples of the various figures, it is to be understood that other similar implementations may be used or modifications and additions may be made to the described examples of a telecommunications system without deviating therefrom. For example, one skilled in the art will recognize that a telecommunications system as described in the instant application may apply to any environment, whether wired or wireless, and may be applied to any number of such devices connected via a communications network and interacting across the network. Therefore, a telecommunications system as described herein should not be limited to any single example, but rather should be construed in breadth and scope in accordance with the appended claims.

What is claimed is:

1. A device comprising:
   a processor having a trusted security zone;
   trusted memory communicatively coupled to a secure area of the processor to form a trusted execution environment (TEE) in which trusted applications operate, the trusted memory having a common repository;
   hardware isolating the TEE from an operating system environment of the device; and
   memory storing instructions that cause the processor to effectuate operations, the operations comprising:
   receiving, from a first trusted application of the trusted applications, a first application data;
   storing the first application data in the common repository;
   determining, based on a policy module of the TEE, that a second trusted application of the trusted applications has permission to access the first application data;
   allowing the second trusted application to access the first application data and to share the first application data with a cloud service of the second trusted application; and
   indicating, by the policy module to a network manager, requirements of a network slice of the network,
   wherein the network manager assigns, based on the requirements and metadata indicating the first application data is being accessed, the device to the network slice of the network.

2. The device of claim 1, further comprising:
   receiving, at the policy module, a request for a network manager of a network connected to the device to access the first application data; and
   allowing the network manager to access the first application data based on the policy module.

3. The device of claim 1, wherein access to the common repository is controlled by the policy module.

4. The device of claim 1, wherein the policy module comprises a user preference regarding the access.

5. The device of claim 1, wherein the first application data comprises health data, the operations further comprising:
   determining, by the policy module, that the health data is subject to a legal protection;
   determining whether a user preference overrides the legal protection with respect to the second trusted application; and
   based on the user preference overriding the legal protection, granting the second trusted application access to the first application data.

6. The device of claim 1, wherein the policy module comprises a carrier-related policy regarding the first application data.

7. The device of claim 1, wherein the policy module comprises a service-agreed rule associated with the first trusted application restricting access to the first application data.

8. The device of claim 1, wherein the network comprises a 5G network.

9. The device of claim 1, wherein assigning the device to a network slice is further based on identifying a network resource for providing a network service to the device.

10. An apparatus comprising:
    a processor;
    trusted memory communicatively coupled to a secure area of the processor to form a trusted execution environment (TEE) in which trusted applications operate, the trusted memory having a common repository;
    hardware isolating the TEE from an operating system environment of the apparatus; and
    memory storing instructions that cause the processor to effectuate operations, the operations comprising:
    receiving, from a first trusted application of the trusted applications, a first application data;

storing the first application data in the common repository;

determining, based on a policy module of the TEE, that a second trusted application of the trusted applications has permission to access the first application data;

allowing the second trusted application to access the first application data;

receiving, at the policy module, a request for a network manager of a network connected to the apparatus to access the first application data;

allowing, based on the policy module, the network manager to access the first application data; and indicating, by the policy module to the network manager, requirements of a network slice of the network, wherein the network manager assigns, based on the requirements and metadata indicating the first application data is being accessed, the apparatus to the network slice of the network.

11. The apparatus of claim 10, wherein allowing the second trusted application to access the first application data comprises:

receiving, from the second trusted application, a request associated with the first application data;

determining, based on the policy module, that the first trusted application has permission to access the first application data; and based on the first trusted application having permission, permitting the first trusted application to access the first application data.

12. The apparatus of claim 11, wherein the policy module comprises a user preference regarding the access.

13. The apparatus of claim 10, wherein the first application data comprises health data, the operations further comprising:

determining, by the policy module, that the health data is subject to a legal protection;

determining whether a user preference overrides the legal protection with respect to the second trusted application; and based on the user preference overriding the legal protection, granting the second trusted application access to the first application data.

14. The apparatus of claim 10, wherein the policy module comprises a carrier-related policy regarding the first application data.

15. The apparatus of claim 10, wherein the policy module comprises a service-agreed rule associated with the first trusted application restricting access to the first application data.

16. The apparatus of claim 10, wherein the network comprises a 5G network.

17. The apparatus of claim 10, wherein assigning the apparatus to a network slice is further based on identifying a network resource for providing a network service to the apparatus.

18. A non-transitory computer readable storage medium that is storing computer executable instructions that when executed by a computing device cause said computing device to effectuate operations comprising:

receiving, from a first trusted application of the trusted applications, a first application data;

storing the first application data in common repository;

determining, based on a policy module of a trusted execution environment (TEE), that a second trusted application of the trusted applications has permission to access the first application data;

allowing the second trusted application to access the first application data and to share the first application data with a cloud service of the second trusted application; and indicating, by the policy module to a network manager, requirements of a network slice of the network, wherein the network manager assigns, based on the requirements and metadata indicating the first application data is being accessed, the device to the network slice of the network.

19. The computer readable storage medium of claim 18, the operations comprising:

receiving, at the policy module, a request for a network manager of a network connected to the device to access the first application data; and allowing the network manager to access the first application data based on the policy module.

20. The computer readable storage medium of claim 18, wherein access to the common repository is controlled by the policy module.

* * * * *